US012585754B2

(12) United States Patent
Pop et al.

(10) Patent No.: US 12,585,754 B2
(45) Date of Patent: Mar. 24, 2026

(54) TRUSTED ROOT RECOVERY

(71) Applicant: MICROSOFT TECHNOLOGY LICENSING, LLC, Redmond, WA (US)

(72) Inventors: Cristian Iuliu Pop, Redmond, WA (US); Michiel van Schaik, Amsterdam (NL); Arturo Lotito, Bergamo (IT); Mahesh Sham Rohera, Sammamish, WA (US); Benjamin Livesley Thomas, Seattle, WA (US); David John Roth, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 267 days.

(21) Appl. No.: 18/188,438

(22) Filed: Mar. 22, 2023

(65) Prior Publication Data

US 2023/0401307 A1 Dec. 14, 2023

Related U.S. Application Data

(60) Provisional application No. 63/352,223, filed on Jun. 14, 2022.

(51) Int. Cl.
*G06F 21/44* (2013.01)
*G06F 8/65* (2018.01)

(52) U.S. Cl.
CPC .............. *G06F 21/445* (2013.01); *G06F 8/65* (2013.01)

(58) Field of Classification Search
CPC ................................. G06F 21/445; G06F 8/65
See application file for complete search history.

(56) References Cited

U.S. PATENT DOCUMENTS

| | | | |
|---|---|---|---|
| 10,382,213 B1 * | 8/2019 | Rafn ..................... | H04L 9/3268 |
| 10,678,529 B1 | 6/2020 | Farhan et al. | |
| 10,728,044 B1 * | 7/2020 | Melo ..................... | H04L 9/0825 |
| 11,323,274 B1 | 5/2022 | Bowen et al. | |
| 2005/0080899 A1 | 4/2005 | Vogel | |
| 2007/0234047 A1 | 10/2007 | Miyazawa | |
| 2013/0227538 A1 * | 8/2013 | Maruyama ................ | G06F 8/65 |
| | | | 717/168 |

(Continued)

OTHER PUBLICATIONS

"Installing a Root CA Certificate in the Trust Store", Retrieved From: https://ubuntu.com/server/docs/security-trust-store, Retrieved on Jun. 6, 2022, 4 Pages.

(Continued)

*Primary Examiner* — Nicholas R Taylor
*Assistant Examiner* — Tania M Pena-Santana
(74) *Attorney, Agent, or Firm* — Han Gim; Newport IP, LLC

(57) ABSTRACT

A device is provisioned to communicate with a cloud service provider when the device is unable to establish a secure connection due to an invalid root certificate authority (CA) certificate installed at the device. The cloud service provider establishes a temporary non-secure connection between a device recovery service and the device. The device recovery service sends a signed updated root CA certificate to the device. Based on the signed updated root CA certificate, a secure connection is established between the device and operational functions at the cloud service provider.

17 Claims, 12 Drawing Sheets

(56) References Cited

U.S. PATENT DOCUMENTS

| | | | |
|---|---|---|---|
| 2016/0036814 A1 | 2/2016 | Conrad et al. | |
| 2016/0315777 A1* | 10/2016 | Lloyd | H04L 9/3265 |
| 2017/0093570 A1 | 3/2017 | Maruyama | |
| 2018/0375852 A1 | 12/2018 | Thom et al. | |
| 2020/0028696 A1* | 1/2020 | Malluru | G06F 21/606 |
| 2020/0151335 A1* | 5/2020 | Ayoub | H04L 63/0435 |
| 2020/0274859 A1 | 8/2020 | Melo et al. | |

OTHER PUBLICATIONS

"Key Vault", Retrieved From: https://azure.microsoft.com/en-us/services/key-vault/#product-overview, Retrieved on Jun. 6, 2022, 6 Pages.

Duraes, et al., "Azure IoT TLS: Critical Changes Are Almost Here! ( . . . and why you should care)", Retrieved From: https://techcommunity.microsoft.com/t5/internet-of-things-blog/azure-iot-tls-critical-changes-are-almost-here-and-why-you/ba-p/2393169, May 27, 2021, 19 Pages.

Gremban, et al., "Control Access to IoT Hub Using Shared Access Signatures", Retrieved From: https://docs.microsoft.com/en-us/azure/iot-hub/iot-hub-dev-guide-sas?tabs=node##sas-token-structure, Apr. 30, 2022, 10 Pages.

U.S. Appl. No. 63/352,223, filed Jun. 14, 2022.

"International Search Report and Written Opinion Issued in PCT Application No. PCT/US23/021291", Mailed Date: Aug. 21, 2023, 11 Pages.

* cited by examiner

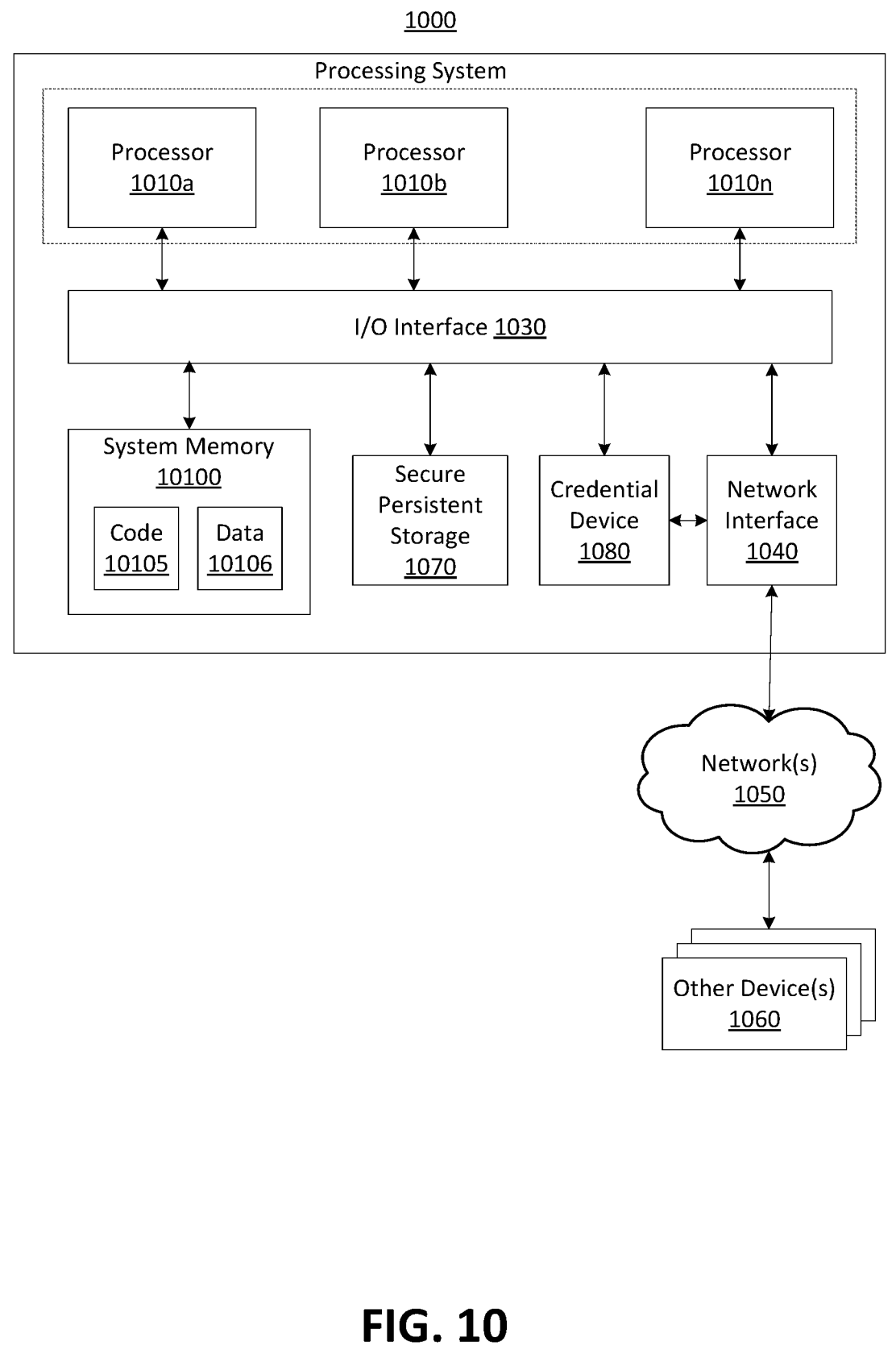

1000

Processing System

Processor
1010a

Processor
1010b

Processor
1010n

I/O Interface 1030

System Memory
10100

Code
10105

Data
10106

Secure
Persistent
Storage
1070

Credential
Device
1080

Network
Interface
1040

Network(s)
1050

Other Device(s)
1060

FIG. 10

TRUSTED ROOT RECOVERY

PRIORITY APPLICATION

This application claims the benefit of and priority to U.S. Provisional Application No. 63/352,223, filed Jun. 14, 2022, the entire contents of which are incorporated herein by reference.

BACKGROUND

Service providers for various devices, such as Internet of Things (IoT) devices, generally require that the devices have the proper credentials to access and use resources of the service providers. Similarly, the devices must ensure that the endpoints at the service provider are properly identified before the devices connect to the endpoints at the service provider. A certificate is issued by a certificate authority (CA) that allows a device to identify the service provider and connect to the endpoints at the service provider. Devices are typically provisioned with one or more CA certificates at the point of manufacture. However, in some cases the CA certificates may expire or otherwise become invalid while the device has been offline. Such devices can fail to connect during normal operation, thus preventing the devices from operating as intended. It is with respect to these considerations and others that the disclosure made herein is presented.

SUMMARY

A root certificate is a public key certificate that identifies a root certificate authority (CA). A CA is a trusted entity that issues certificates that verify the identity of the certificate holder and is used when establishing a secure communication session. A root certificate is one that is at the top of the trust hierarchy for certificates. A root certificate that is issued by a CA is referred to as a root CA certificate and, when installed on a device as a trusted certificate, allows the device to verify the authenticity of other certificates issued by that CA. The disclosed embodiments describe techniques for allowing devices to recover after an initially installed root CA certificate has become invalid, for example due to a change in the CA while a device has been offline. For example, the CA that issued the original root CA certificate may have been replaced by another CA. In some embodiments, the device is associated with an entity such as an enterprise and can be part of a fleet of devices of a large scale system (e.g., an IoT implementation). In such scenarios, it is desirable for enterprises to configure their fleet of devices to be automatically connected to the service provider when the devices are turned on. For example, a fleet of devices uses X509 chain validation in conjunction with domain name validation to verify the authenticity of the service provider endpoints. Chain validation typically assumes the existence of trusted root CA certificates being present on a device. Typically, the initial root CA certificates are installed at the point of manufacture.

However, if the root CA certificate expires, is replaced, or is compromised and needs to be revoked, devices that have not been updated with the proper root CA certificate will fail to connect to the service provider. Some issues that can cause such failures associated with a root CA change are not predictable and thus it is not possible to circumvent all such problems before they occur. Although one solution may be to install multiple root CA certificates, many IoT devices have a smaller device footprint (e.g., limited memory) that can make it difficult to install multiple root CA certificates.

The present disclosure provides a way to address the issues noted above by providing a root CA certificate recovery system and method. In one embodiment, devices with operating systems that have an automatic system update capability are updated with valid root CA certificates by the service provider after the device attempts to connect to the service provider.

In embodiments where an automatic system update mechanism is not available, an embedded bootstrap recovery system is disclosed. The embedded bootstrap recovery system is also referred to herein as a device provisioning system recovery service. In one embodiment, a device that has an invalid root CA certificate (which is also referred to herein as a failed device) temporarily accepts a connection to the device provisioning system recovery service. In an embodiment, the failed device programmatically bypasses security connection mechanisms such as transport layer security (TLS) CA validation, and temporarily accepts a connection for the purpose of recovery. While the failed device is temporarily connected, the failed device downloads signed data containing a new CA trust bundle with an updated, valid root CA certificate. The disclosed embodiments can also be used to update other data and firmware on a failed device, such as a security stack.

In an embodiment, the failed device uses an in-memory root CA certificate or performs a remote device firmware update (DFU) of the trusted root CA store on the failed device. The failed device can also be configured to verify signed data so that the failed device can verify the new CA trust bundle.

In some embodiments, communication and security capabilities that are already present on the device are reused and repurposed for receiving the new CA trust bundle from the embedded bootstrap recovery system. For example, algorithms or data structures already installed on the device can be used for the described recovery protocol to minimize memory and processor usage, avoid the need for new code, as well as other technical benefits.

This Summary is provided to introduce a selection of concepts in a simplified form that are further described below in the Detailed Description. This Summary is not intended to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale.

FIG. 10 depicts an example computing device.

DETAILED DESCRIPTION OF ILLUSTRATIVE EMBODIMENTS

Various embodiments are disclosed for enabling a device to establish connectivity with a service provider when previously installed data or software undergoes a failure during device initialization, for example, during initial power-up. Such a failure can include a root CA certificate that is unusable to establish the intended connection, for example because the root CA certificate has expired, or the CA has changed. In various embodiments, the device temporarily accepts a connection to a device recovery service and download signed data containing a valid root CA certificate. The disclosed embodiments enable the update of other data and firmware on a failed device, such as a security stack.

Figure 1A:
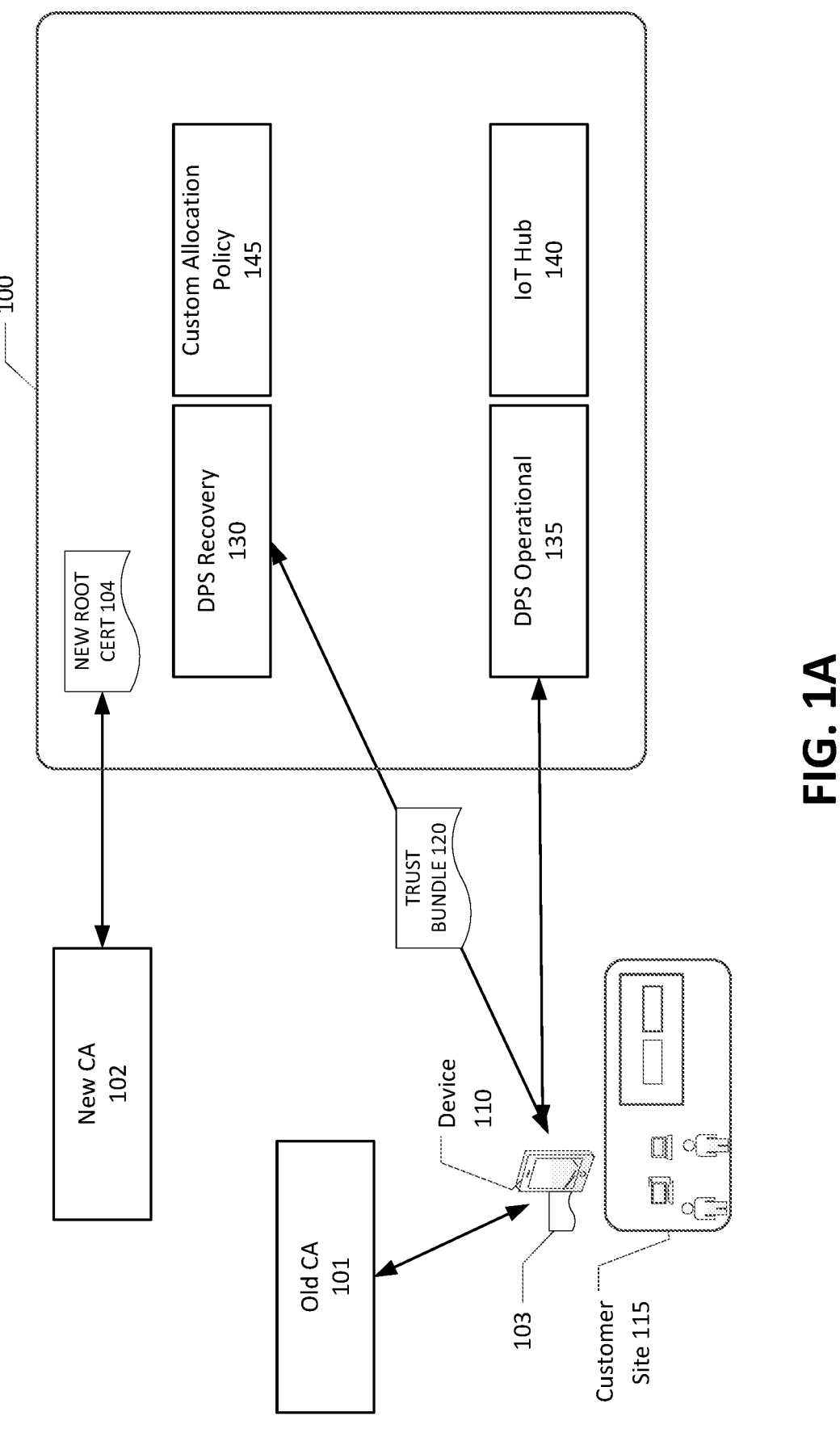
FIG. 1A depicts an example of a computing architecture where aspects of the disclosure are implemented.

With reference to FIG. 1A, a device 110 is illustrated that is capable of communicating on a network to service provider 100. The device 110 typically connects to the service provider 100 by accessing the Internet, for example over a local WI-FI connection or a mobile network. The device 110 communicates to the service provider 100 using a secure protocol such as Transport Layer Security (TLS), which requires a valid root CA certificate 103 to enable exchange of key information. In some cases, the root CA certificate 103 can become outdated. This can occur, for example, if as shown in FIG. 1A, the old certificate authority (CA) 101 that signs the root CA certificate 103 has changed. In this case, the device 110 has a root CA certificate 103 that does not match that of the service provider 100 as the service provider 100 has a new root CA certificate 104 signed by a new CA 102 while the device 110 still has the root CA certificate 103 signed by the old CA 101. The device 110 will thus not able to trust the service provider 100 and establish a secure connection.

In some implementations, a device is provisioned to maintain more than one root CA certificate. However, it may not be feasible to install multiple root CA certificates on certain devices. This can occur, for example, when thousands or millions of devices are procured, which greatly increases the complexity of such a solution, or when the devices have limited storage and processing capacity and is unable to store and manage multiple certificates.

It may be possible to replace devices with invalid root CA certificates with devices that have updated firmware including the updated root CA certificate. However, this can be an expensive solution, and undesirable and impractical for many users, in particular when the devices are part of a fleet of thousands or millions of devices. Another solution is to manually update the devices using a local update procedure, such as physically connecting to each device using a computer or other device that is capable of updating the device. Again, this is not feasible for situations involving large fleets of devices or when devices are in remote, hard to reach locations. Additionally, updating of the root CA certificate must be done in a secure manner to avoid exposing the device and associated services from malicious users.

In an embodiment, a device 110 at customer site 115 attempts to connect to DPS operational 135 but is unable to connect due to an invalid root CA certificate 103. In an embodiment, DPS recovery 130 provides a root CA certificate recovery service for devices with invalid root CA certificates. In some embodiments, the service provider 100 implements the root CA certificate recovery service as part of a dedicated recovery service. In the example shown in FIG. 1A, the dedicated recovery service is implemented as DPS recovery 130. The DPS recovery 130 provides isolation from operational service provider operations during the recovery process.

In one implementation, IoT hub 140 is an IoT platform that provides communication and services between IoT applications at the service provider 100 and device 110. The IoT platform is more generally an application platform for IoT devices. DPS operational 135 is part of a set of services for the IoT platform that enables automatic provisioning of devices such as device 110 without requiring operator intervention. In some embodiments, DPS recovery 130 is instantiated as needed when device provisioning fails for the reasons noted above. Devices that are serviced by the service provider 100 are provided the key(s) to be able to securely connect to DPS recovery 130.

In an embodiment, each device has its own recovery key such as a symmetric key (e.g., password) or a public/private key pair. The recovery key can be changed after recovery is successfully completed (e.g., through a remote device firmware update) to reduce expose to security risks. Each device can also have a recovery identity that is used to authenticate the device with DPS recovery 130.

If the device 110 is unable to connect to the DPS operational 135, then the device 110 will also be unable to connect to DPS recovery 130 due to its invalid root CA certificate 103. Accordingly, in an embodiment, device 110 programmatically bypasses CA validation. For example, device 110 is configured to bypass TLS validation. Once the TLS validation has been bypassed, the device 110 allows entrusted data transfer from the service provider 100 generally and trusts the data from DPS recovery 130. The device 110 thus is able to receive updates including trust bundle 120 having an updated root CA certificate that is signed and dated and can be used to verify authenticity.

In some embodiments, DPS recovery 130 is accessed by the device 110 using existing messaging schemes that are configured on the device 110 for interacting with DPS recovery 130. The device 110 can thus use existing communication methods to receive the new CA trust bundle 120.

In an embodiment, the device 110 uses an in-memory root CA certificate or perform a remote device firmware update of the trusted root CA store. Additionally, device 110 is configured to verify signed data. Other communication and security capabilities already present on the device 110 are reused and repurposed for the recovery system to reduce processing and memory usage.

Figure 1B:
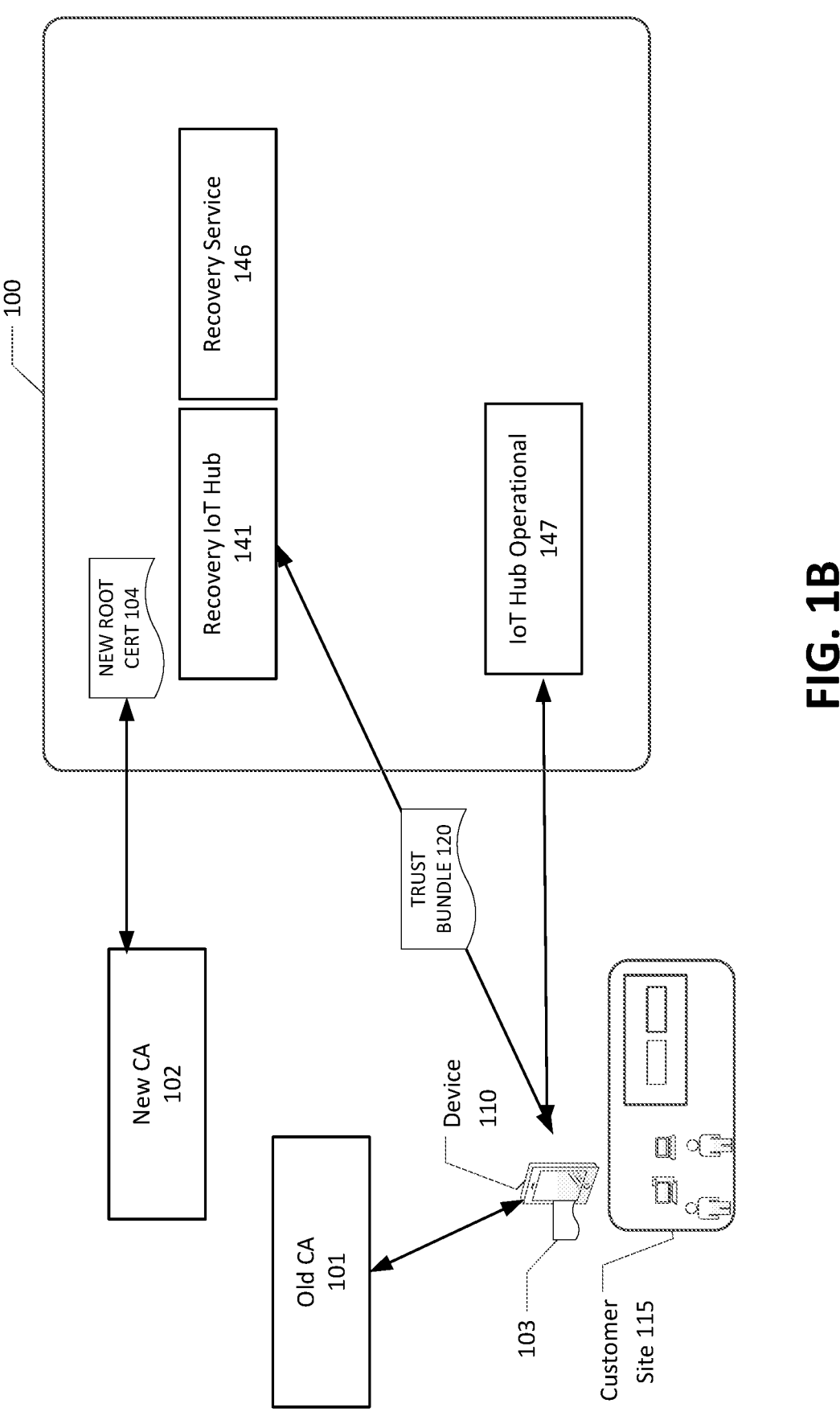
FIG. 1B depicts an example of a computing architecture where aspects of the disclosure are implemented.

With reference to FIG. 1B, illustrated is another embodiment where device 110 is capable of communicating on a network to service provider 100. In an embodiment, a device 110 at customer site 115 attempts to connect to IoT hub operational 147 but is unable to connect due to its invalid root CA certificate 103. IoT hub operational 147 is a cloud platform that provides device authentication and management. In one implementation, IoT hub operational 147 is a central hub for communication between an IoT application and its attached devices, and can provide services for fleets of IoT devices. For example, a manufacturing cloud user can deploy a fleet of IoT sensors at a manufacturing site that is serviced by the service provider 100. In the example of FIG. 1B, IoT hub operational 147 provides a root CA certificate recovery service for devices with invalid root CA certificates. Device 110 is configured with the capability of programmatically bypassing CA validation, and device 110 allows entrusted data transfer from Recovery IoT Hub 141 which enables communication with recovery service 146. The device 110 thus is able to receive updates including trust bundle 120 having an updated root CA certificate that is signed and dated and can be used to verify authenticity.

Figure 1C:
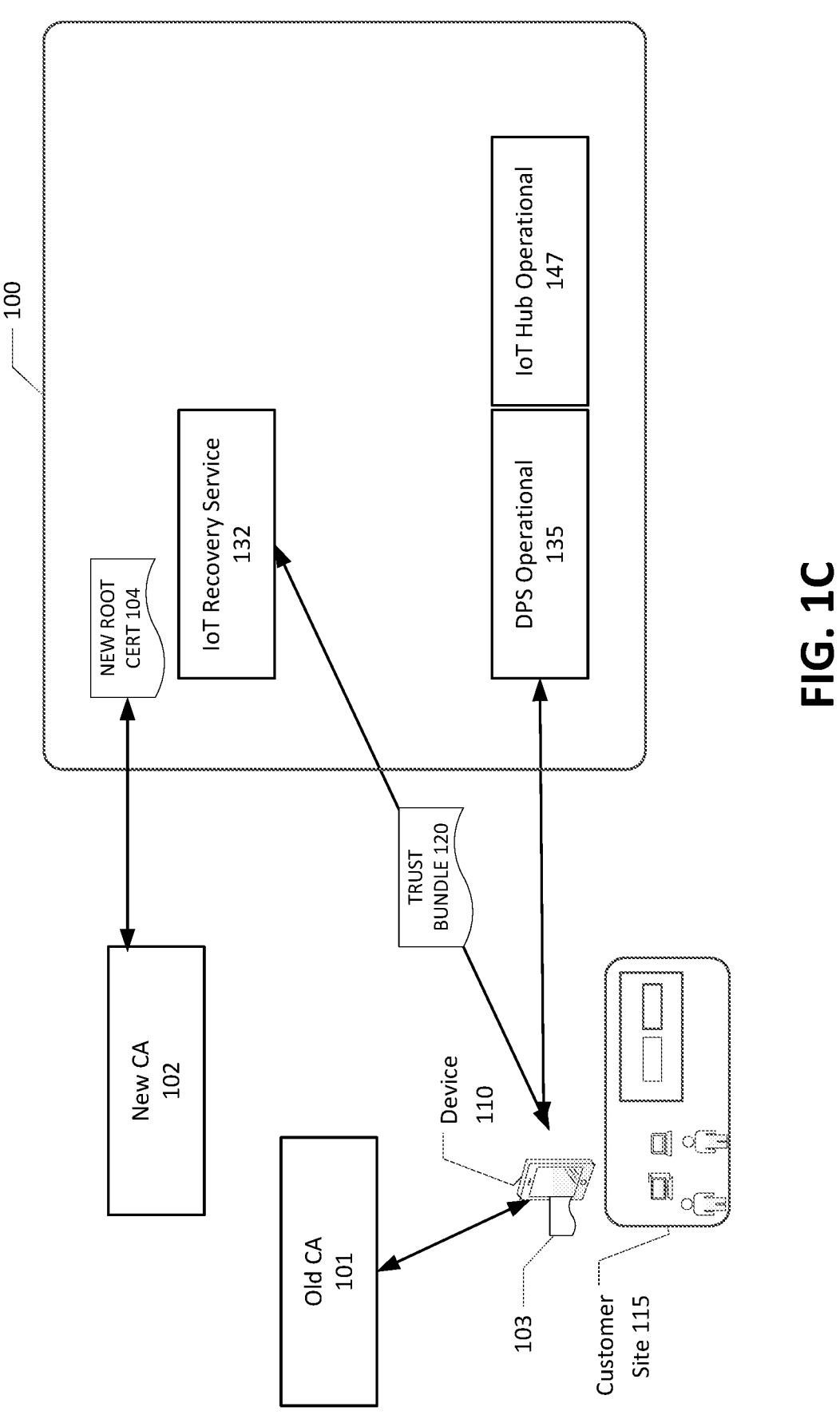
FIG. 1C depicts an example of a computing architecture where aspects of the disclosure are implemented.

With reference to FIG. 1C, illustrated is another embodiment where device 110 is capable of communicating on a network to service provider 100. In an embodiment, a device 110 at customer site 115 attempts to connect to DPS operational 135 or IoT hub operational 147 but is unable to connect due to its invalid root CA certificate 103. In the example of FIG. 1C, an IoT recovery service 132 provides a root CA certificate recovery service for devices with invalid root CA certificates. Device 110 is configured with the capability of programmatically bypassing CA validation, and device 110 allows entrusted data transfer from IoT Recovery Service 132. The device 110 thus is able to receive updates including trust bundle 120 having an updated root CA certificate that is signed and dated and can be used to verify authenticity.

Figure 2:
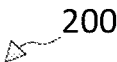
FIG. 2 depicts an example of a flowchart in accordance with aspects of the disclosure.
Figure 2:
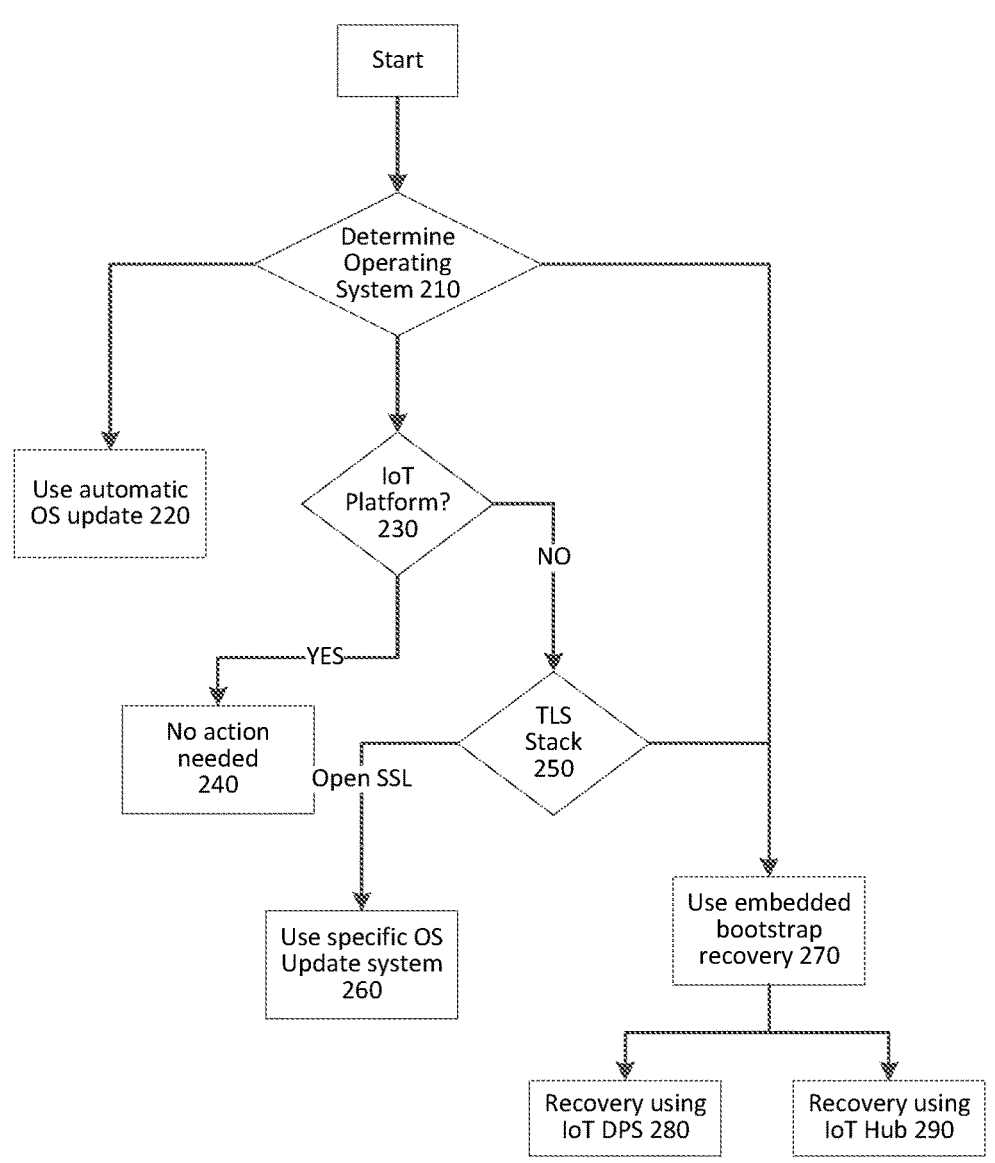

In some embodiments where automated update processes are available for the devices, such automated update processes are used to update the root CA certificate. With reference to FIG. 2, illustrated is a process 200 for determining a trusted root CA store recovery method.

In operation 210, the operating system (or lack thereof) of a device such as device 110 is determined. Based on determining the operating system of the device, e.g., if the device is running operating systems such as WINDOWS, MacOS, IOS, or ANDROID, operation 220 illustrates that the corresponding automatic OS update mechanism for the operating system is used to update the trusted root store containing the root CA certificate. For these operating systems, the OS TLS stack is automatically upgraded, and the service provider provides the updated certificates as part of the update. If the operating system is determined to be LINUX, when automatic updates are enabled and OpenSSL is used with the latest security updates, some LINUX distributions allow automatic updates of the trusted certification authority root store such as the UBUNTU's CA-certificates APT package. Operation 230 illustrates determining if the device is using a platform such as an IoT platform. If it is determined that the device is using an IoT platform (e.g., AZURE SPHERE), then the platform provides an update system and an update service, and thus no further action is needed 240.

If the device does not use an IoT platform (e.g., an application platform for IoT devices), then operation 250 illustrates determining the security stack on the TLS stack. If the stack is OpenSSL, then the specific OS update system can be used 260. For example, LINUX distributions typically have automatic OS update systems that are used to provide the system update.

Some devices use an embedded bootstrap recovery system as disclosed herein. Such devices include devices using other stacks (WolfSSL, mbedTLS, BearSSL, etc.), various LINUX systems that do not have an automatic trusted root CA store update system, real time operating system (RTOS)

systems, bare metal implementations, and custom operating systems that otherwise are not capable of receiving automatic updates. Operation 270 illustrates using the embedded bootstrap recovery system. As described further herein, the recovery may use an IoT device provisioning system (DPS) 280 or an IoT hub 290. The IoT hub 290 is a cloud-based IoT platform that provides communication and services between IoT applications and deployed IoT devices. The DPS 280 is a service (e.g., of the IoT platform) that enables automatic provisioning of devices without requiring operator intervention.

Figure 3:
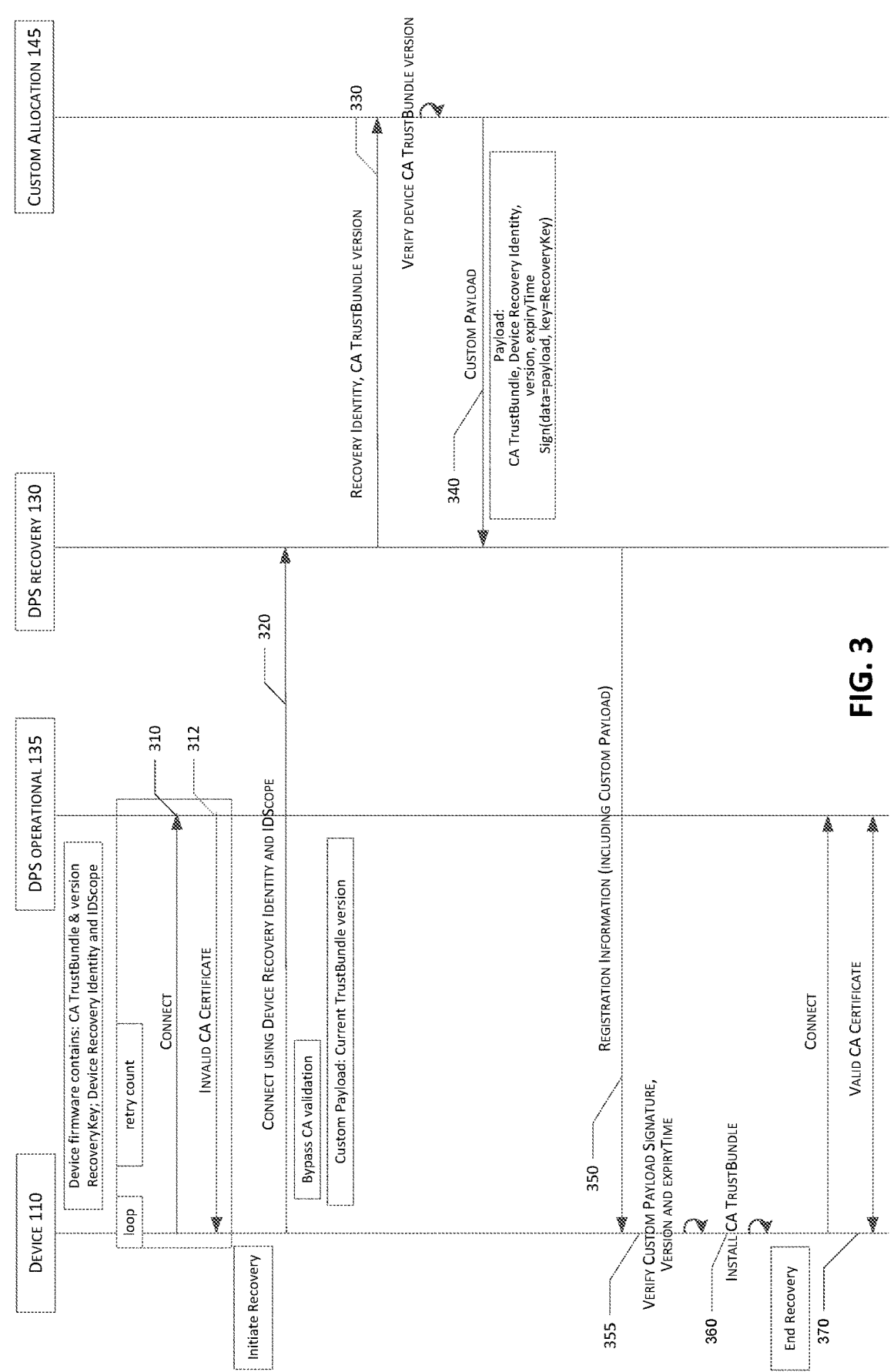
FIG. 3 depicts an example flowchart for provisioning of devices.

FIG. 3 illustrates a flow diagram that corresponds to some of the components illustrated in FIG. 1A. A device 110 attempts to connect 310 to DPS operational 135 but is unable to connect 312 due to an invalid root CA certificate. The device 110 temporarily accepts a connection to DPS recovery 130 for recovery purposes only by connecting (320) using the device recovery identity. In some embodiments, IDScope is an identifier that identifies an instance of DPS recovery 130. DPS recovery 130 provides the CA certificate service for devices with invalid root CA certificates. DPS recovery 130 forwards 330 the recovery identity and the CA trust bundle version to custom allocation 145 which is configured to construct and sign recovery data using an internal database of device recovery identities and recovery keys. Custom allocation 145 provides 340 a new CA trust bundle that includes the correct root CA certificate. The device 110 downloads 350 signed data containing a new CA trust bundle. In some embodiments, the DPS recovery 130 is accessed by the device 110 using existing messaging schemes that are configured on the device 110 for using DPS recovery 130. The device 110 can thus use existing communication methods to receive the new CA trust bundle.

In an embodiment, device 110 uses an in-memory root CA certificate or performs a remote device firmware update of the trusted root CA store. Additionally, device 110 is configured to verify signed data 355. The device 110 installs 360 the received trust bundle and establishes a connection 370 to DPS operational 135. Other communication and security capabilities already present on the device 110 are reused and repurposed for the recovery system to reduce processing and memory usage.

Figure 4:
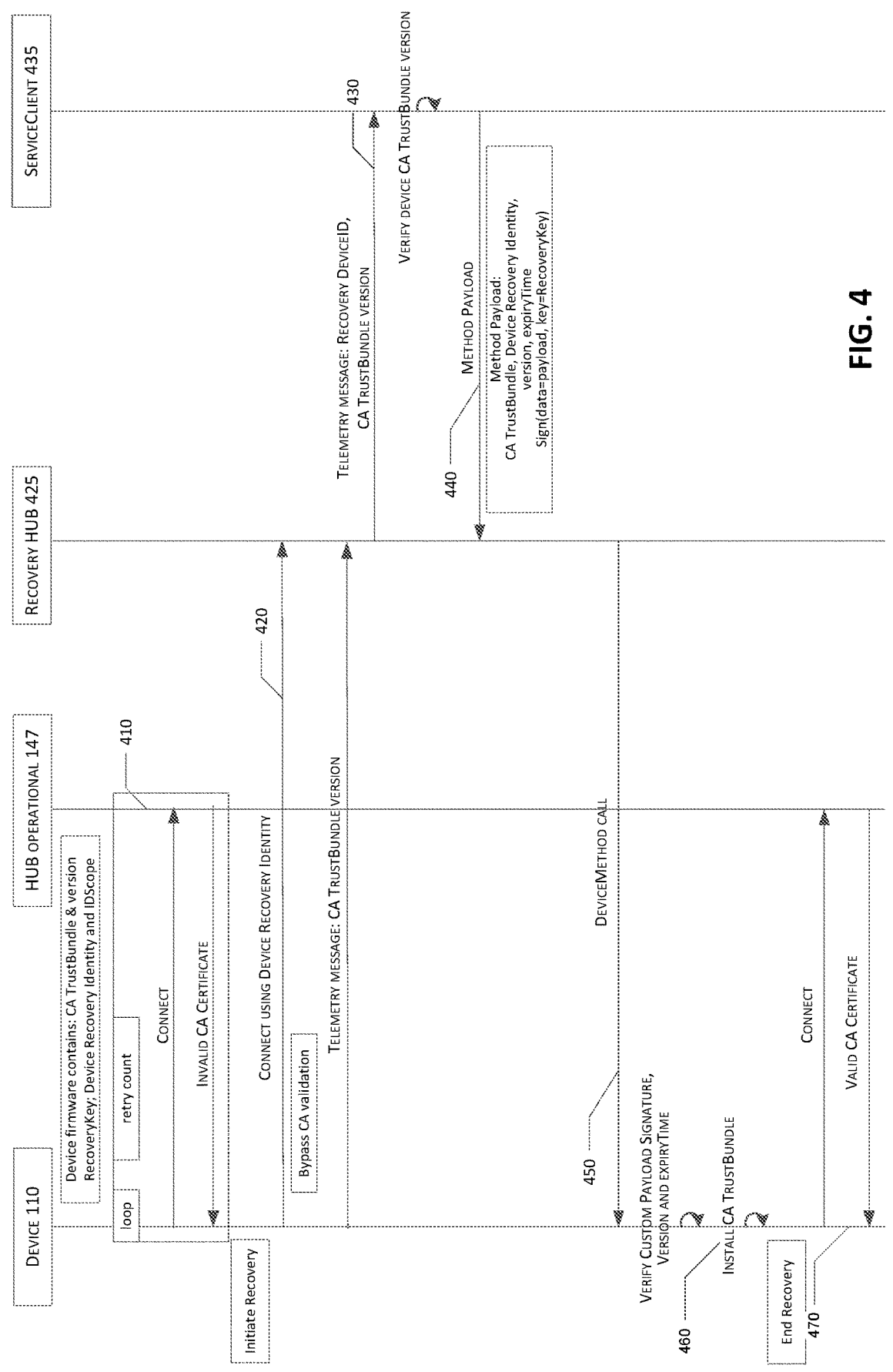
FIG. 4 depicts an example flowchart for provisioning of devices.

With reference to FIG. 4, for resource constrained devices that are not capable of supporting interaction with DPS recovery 130, the device 110 uses an instance of a recovery hub. While the recovery process is similar to the process illustrated in FIG. 3, the communications changes from having a serverless service provider function callback provided by custom allocation 145 to hosting a service provider IoT recovery back-end service illustrated as service client 435.

In an embodiment, the device 110 attempts to connect 410 to hub operational 147 but is unable to connect due to an invalid root CA certificate. Device 110 temporarily accepts a connection to recovery hub 425 for recovery purposes only by connecting using the device recovery identity 420. The recovery hub 425 is configured to exchange telemetry messages with the device 110. In one embodiment, a back-end service uses device-to-cloud telemetry and cloud-to-device methods to transfer information to the device 110. In one implementation, the back-end service is provided by service client 435 and can include a registry manager. In an embodiment, the service client 435 is implemented as code for a given customer associated with the device 110. The service client 435 receives 430 a telemetry message including the recovery identity and the CA trust bundle version of the device 110. Service client 435 is configured to verify the current CA trust bundle version and construct and sign recovery data using an internal database of device recovery identities and recovery keys. Service client 435 provides 440 a new CA trust bundle with the correct root CA certificate. The recovery hub 425 is configured to send 450 the trust bundle payload to the device 110 using a device method call. The device installs 460 the received trust bundle and establishes a connection 470 to hub operation 147.

As shown in FIG. 3 and FIG. 4, the device 110 connects to services using its device recovery identity which is different than the operational identity. The device 110 also connects using a recovery service ID (e.g., IDScope) which identifies an instance of the DPS recovery service. The device 110 creates a custom payload containing the current certificate set version (current trust bundle version). While some devices have only one root CA certificate, in some cases, a device has more than one root CA certificate and such devices include a version for the list of root CA certificates.

In an embodiment, the described functions at the service provider 100 are instantiated as needed. The custom allocation 145 is instantiated at the service provider 100. The custom allocation 145 runs code specific to a customer or user and verifies that the version received from the device 110 is lower than the recovery CA bundle version. The custom allocation 145, which can be implemented as a service provider function running code for the customer associated with the device 110, creates a custom payload that includes a new trust bundle. The new trust bundle is specific to the device 110.

In an embodiment, the custom payload contains the device identity, the new recovery CA bundle version, and an expiry time of the payload. The custom payload is signed with the particular key for the device (e.g., the recovery key). When the device 110 receives the registration information or receives a method payload, the device 110 validates the signature to confirm that the sending service is the correct service (e.g., DPS recovery 130 or recovery hub 425). The device 110 also verifies that the version(s) of the new root CA certificate(s) is/are greater than the version of the existing certificate(s). The device 110 also verifies that the expiry time has not lapsed. Once verified, the device 110 installs the trust bundle using an in-memory certificate or performs a remote device firmware update of the trusted root store. Once installed, the device starts using the new root CA certificate and establishes a valid connection to the appropriate operational service.

In an embodiment, the service provider 100 creates new, recovery-specific service instances (e.g., at the device provisioning service or IoT hub) to provide separation from operational services. The operational services can normally be scaled down, and actual creation of recovery identities can be delayed until device recovery is needed/initiated. For example, use of operational services for recovery purposes exposes the device identity and data to a potential attacker. In an embodiment, the device 110 verifies the identity of operational services (e.g., using CA and X509 chain validation). Alternatively, an operational device provisioning service may be reused for recovery if a different recovery identity is used for authentication.

In some embodiments, all recovery attempts (successful or not) are logged by the device and reported to the service provider. Additionally, to minimize exposure to potential security issues, the device provisioning service may be kept offline until device recovery is required/initiated.

Figure 6:
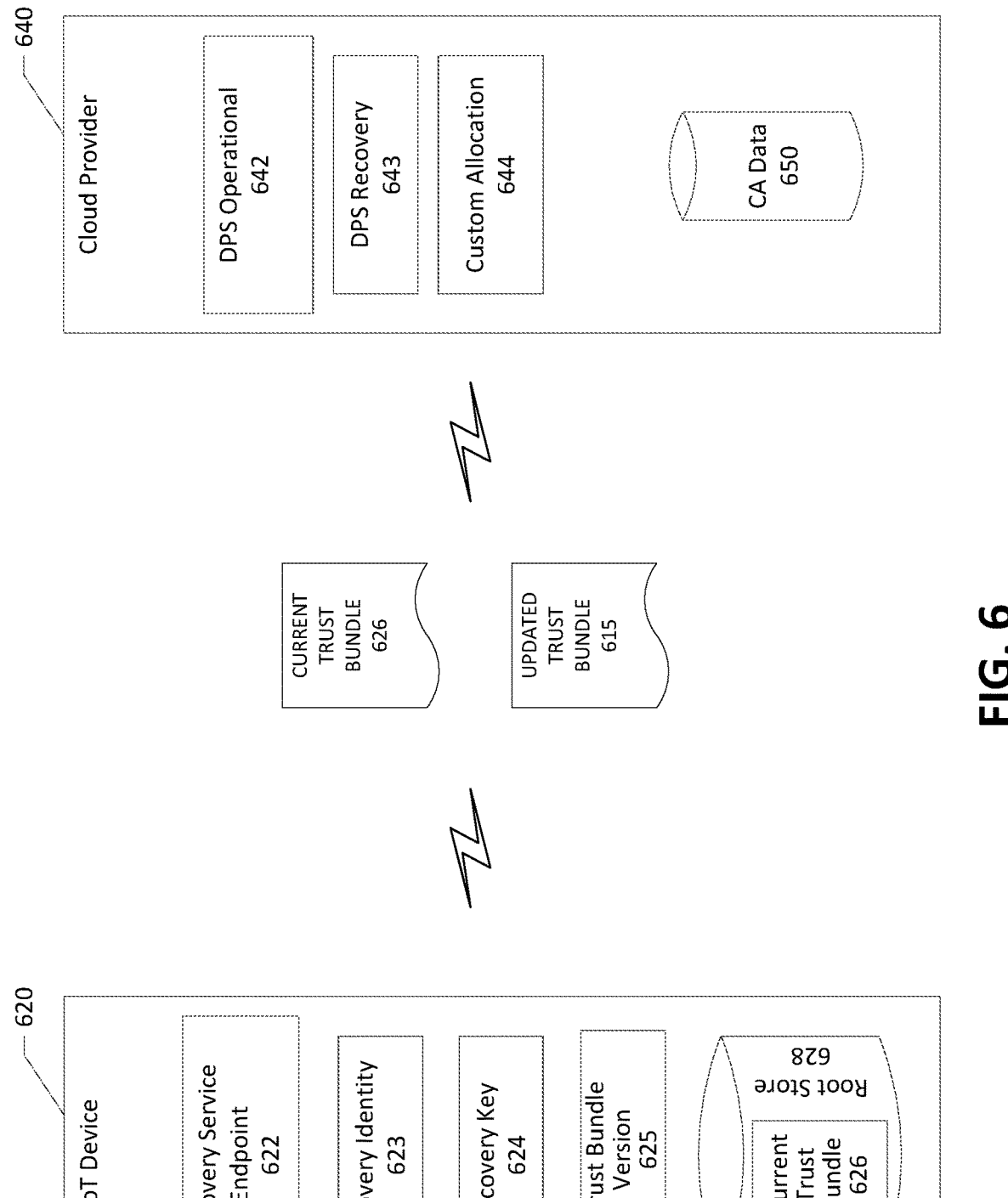
FIG. 6 depicts an example of a computing architecture where aspects of the disclosure are implemented.

With reference to FIG. 6, in an embodiment, the IoT device 620 is configured with firmware that contains one or more of the following recovery information: current CA trust bundle 626 stored in root store 628, which includes one or more root CA certificates; current CA trust bundle version 625 (e.g., v1); recovery key 624 (each device has its own recovery key which, for example, is a symmetric key or a public/private key pair); recovery identity 623, which enables the device to identify itself to the recovery service; and recovery service endpoint 622 (e.g., device provisioning service ID or hub domain name). The cloud provider 640 provides various recovery services as described herein, including DPS operational 642, DPS recovery 643, and custom allocation 644. An internal database 650 may store root CA certificate information. During the recovery process, the IoT device 620 sends the current trust bundle 626 to the cloud provider 640. As part of the recovery services implemented by cloud provider 640, DPS operational 642, DPS recovery 643, or custom allocation 644 sends an updated trust bundle 615 having an updated root CA certificate that is signed and dated and can be used to verify authenticity.

In some embodiments, the current CA trust bundle 626 and version are stored in a different, updatable firmware partition. On devices using external modems (e.g., WI-FI, cellular, satellite communications), root CA certificates are typically stored within the modem memory or firmware. For secure storage, contents of the CA trust bundle can be stored in a way that cannot be easily accessed or changed (e.g., hardware security module or secured enclave).

To conserve processing and memory resources on devices with smaller footprints, the devices may implement the disclosed techniques in part by using algorithms already on-board the device. For example, the device may use key cryptographic algorithms and payload signature algorithms such as Shared Access Signature (SAS) Key Authentication, Rivest-Shamir-Adleman (RSA), or elliptic curve cryptography (ECC), if such algorithms are available on the device. Some device update processes for IoT devices use a set of root keys to verify the authenticity of update manifests. Root keys may be the root of trust for device update signatures, where any signature must be chained up through one of the root keys to be considered legitimate. The set of root keys can change over time as it is proper to periodically rotate signing keys for security purposes. However, shelved devices can be activated after both root keys have been rotated. In such cases, the device will not be able to accept device updates.

In some cases, updates of the service provider servers can cause changes in service capabilities which in turn cause the device/service capability intersection to result in an empty set. In other cases, device-side TLS bugs or RAM usage can cause the device to be unable to connect to the service provider.

In such situations, the device will be unable to connect to the service provider. Although the device verifies that the service is correct, the channel is still not negotiated correctly and a TLS channel cannot be created, thus preventing the device from connecting to services. Other such issues can require an update at the device, for example in the firmware that is currently installed on the device.

Figure 5:
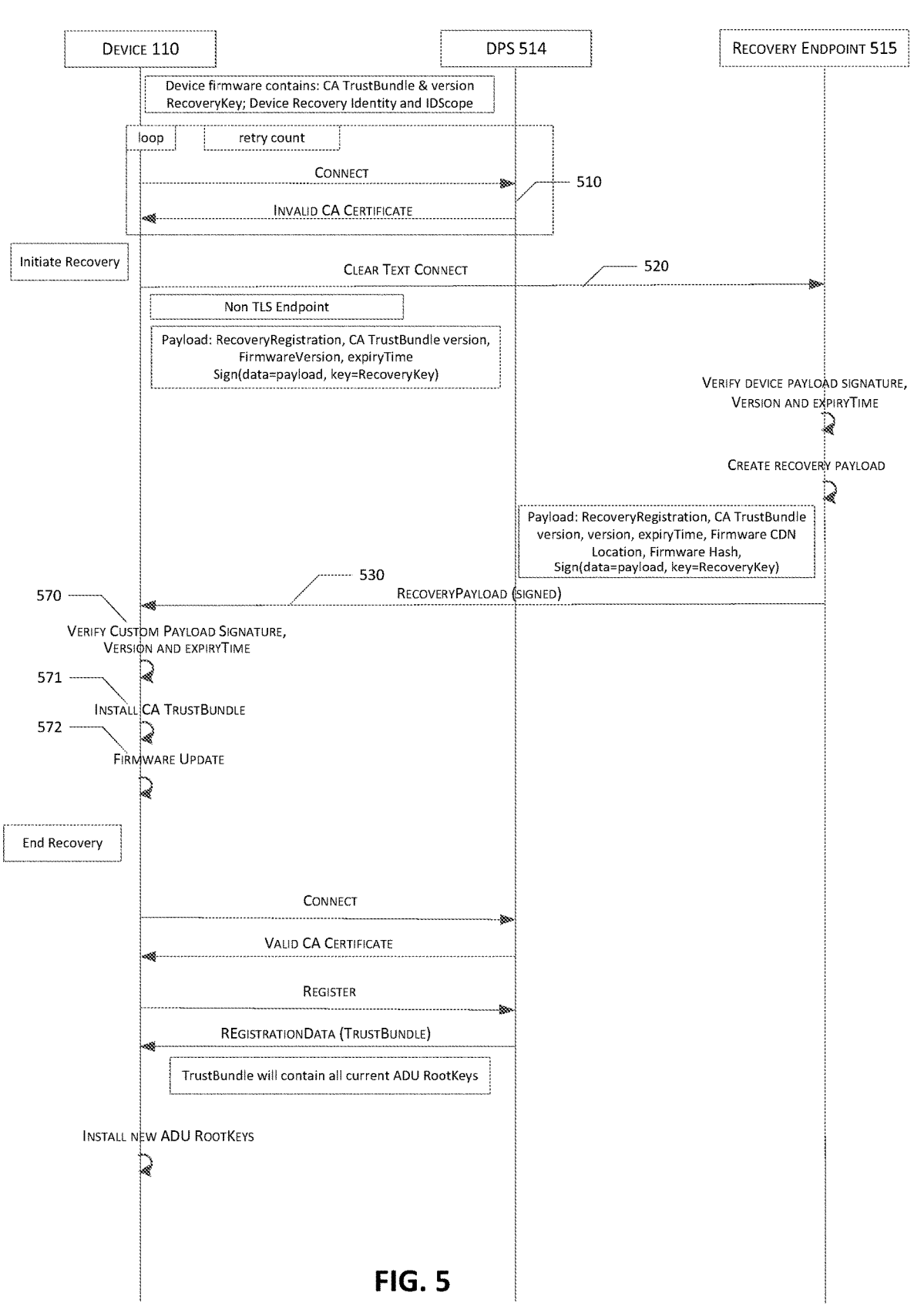
FIG. 5 depicts an example flowchart for provisioning of devices.

FIG. 5 illustrates a flow diagram for allowing such a device to establish a connection to the service provider and address device-side issues. In addition to CA root changes, such issues include device update root key changes, server TLS stack updates, and other updates that may be needed in the device data and firmware.

With reference to FIG. 5, for resource constrained devices that are not capable of supporting interaction with DPS 514, the device 110 uses an instance of a recovery endpoint 515. In an embodiment, the device 110 attempts to connect 510 to DPS 514 but is unable to connect due to one of the issues noted above. Device 110 establishes a clear text (e.g., unencrypted) connection 520 with recovery endpoint 515. The recovery endpoint 515 receives a payload including the CA trust bundle version of the device 110. The recovery endpoint 515 is configured to verify the signature of the device payload, CA trust bundle version, and the expiration time. The recovery endpoint 515 is further configured to construct a recovery payload including a firmware location. The recovery endpoint 515 is configured to send 530 the recovery payload to the device 110. The recovery payload includes a firmware location to update the TLS stack or other functions, and a firmware hash to verify the update file. The device 110 verifies the payload 570, installs the trust bundle 571, and performs a firmware update 572 based on the firmware location. The trust bundle includes new root keys, or other firmware or data for updating the device.

The techniques described herein can be implemented for devices in communication with various wireless communications systems such as CDMA, TDMA, FDMA, OFDMA, and SC-FDMA. A CDMA system implements a radio technology such as CDMA2000, Universal Terrestrial Radio Access (UTRA), etc. A TDMA system implements a radio technology such as Global System for Mobile Communications (GSM). An OFDMA system implements a radio technology such as Ultra Mobile Broadband (UMB), Evolved UTRA (E-UTRA), IEEE 802.11 (WIFI), IEEE 802.16 (WiMAX), IEEE 802.20, Flash-OFDMA, etc. The techniques described herein can be used for the systems and radio technologies mentioned above as well as other systems and radio technologies. The description below, however, describes a cellular system for purposes of example, although the techniques are applicable beyond cellular applications.

The described embodiments are advantageous in scenarios where an enterprise implements an automatic configuration flow, where a device that has connectivity can be enrolled by the enterprise and the enterprise images can be pushed out to the device to comply with enterprise policies and requirements. The embodiments described herein allow for the automatic configuration flow to be implemented when connectivity is not available for the enterprise device due to an invalid root CA certificate.

In some embodiments, the enterprise prearranges subscription information for an IoT device with the service provider so that enterprise devices can be pre-authorized to obtain services from the service provider.

Figure 7:
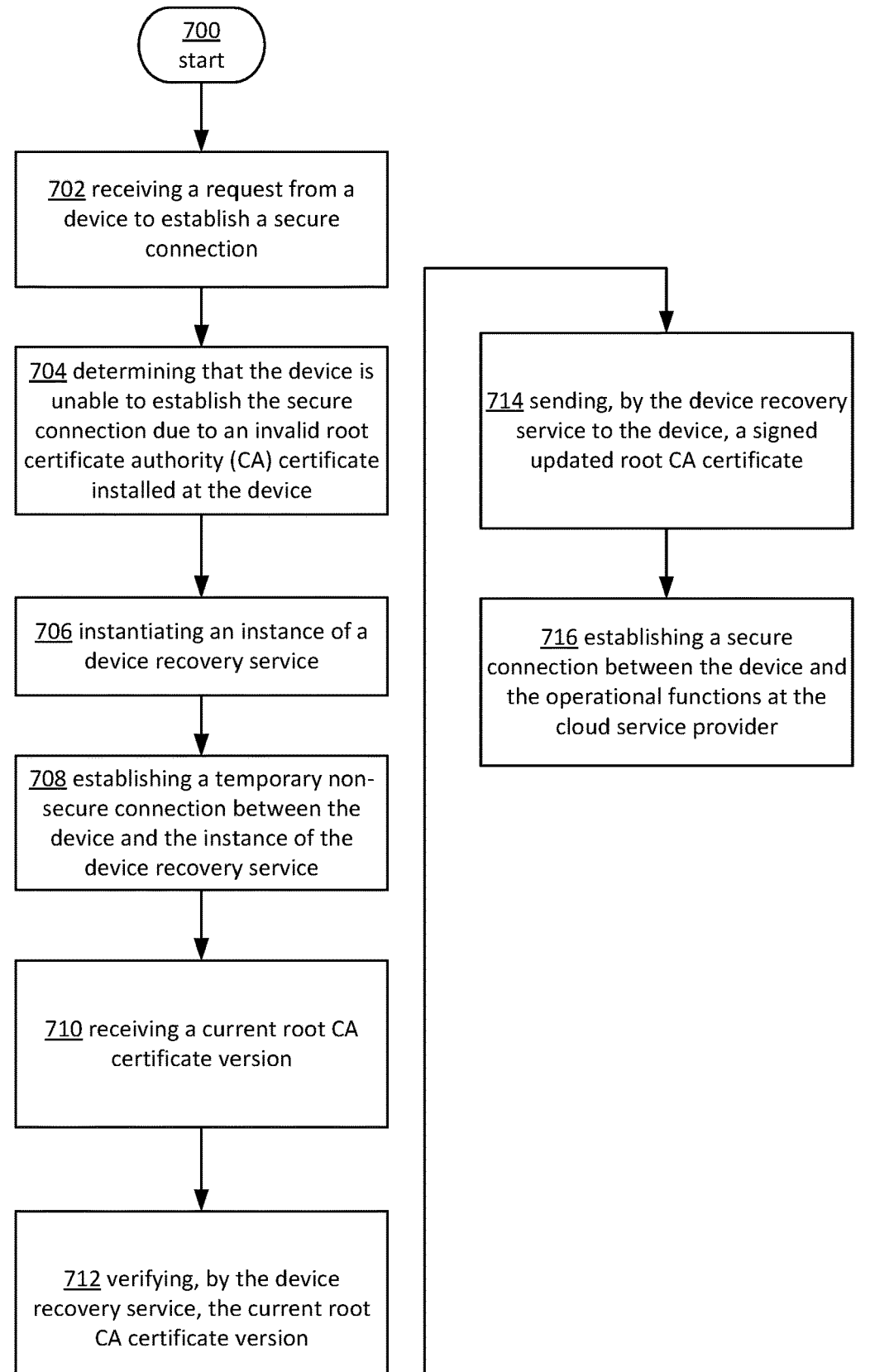
FIG. 7 depicts an example operational procedure for provisioning of devices.

FIG. 7 illustrates an example operational procedure for one embodiment of provisioning a device configured to communicate with a cloud service provider over a communications network in accordance with this disclosure. In an embodiment, the operational procedure is implemented in a computing device. The computing device has a memory that has stored thereon computer-executable instructions that, when executed, cause the computing device to perform operations as described. Referring to FIG. 7, operation 700 begins the operational procedure. Operation 700 is followed by operation 702. Operation 702 illustrates receiving, by a cloud service provider, a request from a device to establish a secure connection.

Operation 702 is followed by operation 704. Operation 704 illustrates determining that the device is unable to establish the secure connection due to an invalid root certificate authority (CA) certificate installed at the device. For example, the device may have a root CA certificate that does not match that of the cloud service provider because the cloud service provider has a root CA certificate signed by a new CA while the device still has a root CA certificate signed by an old CA. Operation 704 is followed by operation 706. Operation 706 illustrates instantiating, at the cloud service provider, an instance of a device recovery service. For example, the cloud service provider creates a new, recovery-specific service instance to provide separation from operational services. The operational services can normally be scaled down, and actual creation of recovery identities can be delayed until device recovery is needed or initiated. In an embodiment, the device recovery service is partitioned from operational functions at the cloud service provider. In an embodiment, the device recovery service corresponds to DPS recovery, recovery IoT hub, and IoT recovery service as described herein. Operation 706 is followed by operation 708. Operation 708 illustrates establishing a temporary non-secure connection between the device and the instance of the device recovery service. In an example, TLS validation can be programmatically bypassed. The device now allows entrusted data transfer from the cloud service provider. In an embodiment, the temporary non-secure connection is limited to communications for updating the root CA certificate for the device. In an embodiment, the temporary non-secure connection is established based on a recovery identifier and a service identifier received from the device. In an embodiment, the instance is partitioned from operational functions at the cloud service provider. Operation 708 is followed by operation 710. Operation 710 illustrates receiving, from the device via the temporary non-secure connection, a current root CA certificate version. The current root CA certificate version indicates the version of the root certificate that the device currently has installed. Operation 710 is followed by operation 712. Operation 712 illustrates verifying, by the device recovery service, the current root CA certificate version. Operation 712 is followed by operation 714. Operation 714 illustrates sending, by the device recovery service to the device, a signed updated root CA certificate. In an embodiment, the updated root CA certificate is sent to the device in a data package having an expiration time after which the updated root CA certificate cannot be installed by the device. Operation 714 is followed by operation 716. Operation 716 illustrates based on the signed updated root CA certificate, establishing a secure connection between the device and the operational functions at the cloud service provider. In an embodiment, a current version of firmware installed on the device is also sent to the cloud service provider. In response to verifying the current version of the firmware installed on the device, the cloud service provider sends to the device via the temporary non-secure connection, a signed data package that includes a download location for an updated version of the firmware installed on the device.

Figure 8:
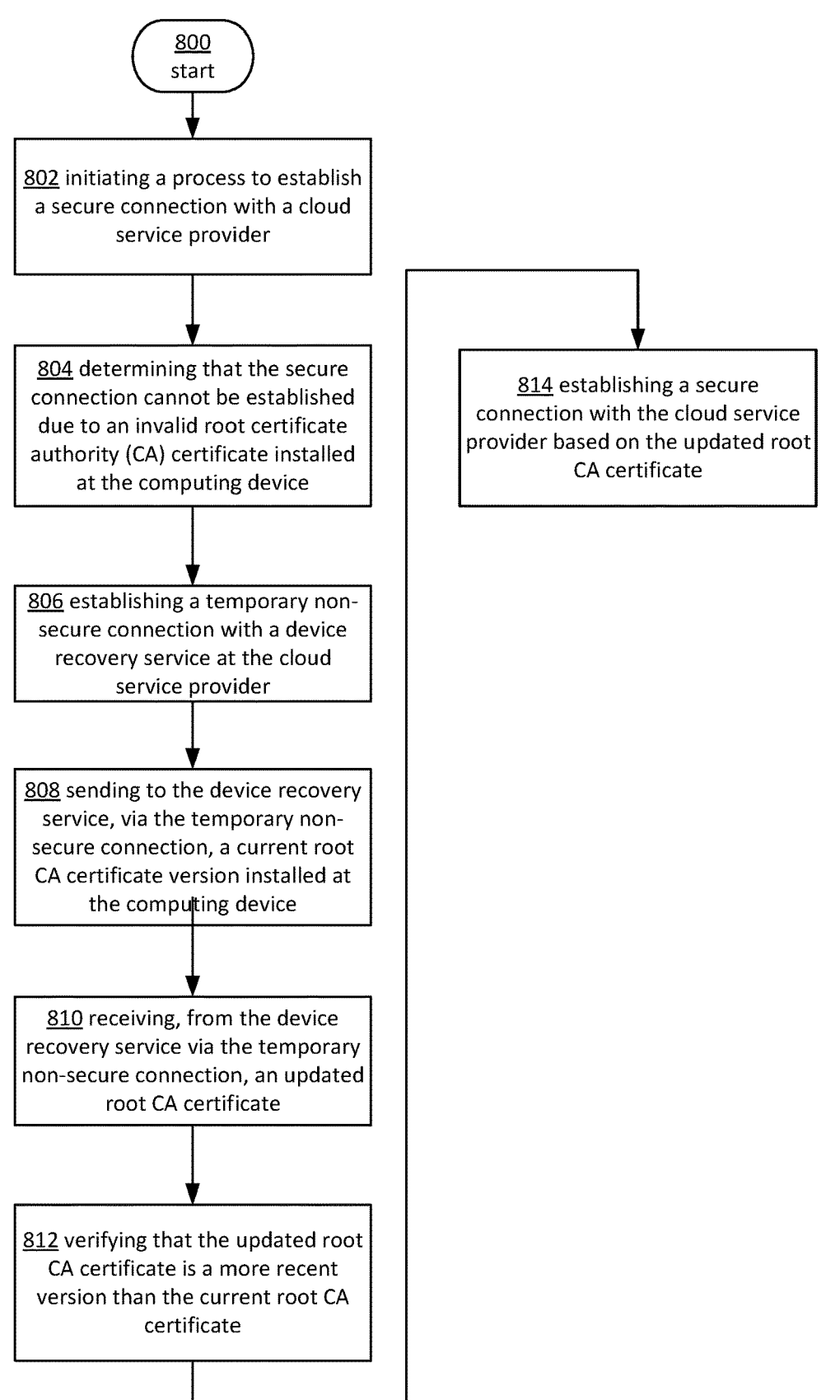
FIG. 8 depicts an example operational procedure for provisioning of devices.

FIG. 8 illustrates an example operational procedure for another embodiment of provisioning a device configured to communicate with a cloud service provider over a communications network in accordance with this disclosure. In an embodiment, the operational procedure is implemented in a computing device. The computing device has a memory that has stored thereon computer-executable instructions that, when executed, cause the computing device to perform operations as described. Referring to FIG. 8, operation 800 begins the operational procedure. Operation 800 is followed by operation 802. Operation 802 illustrates initiating a process to establish a secure connection with a cloud service provider, determining that the secure connection cannot be established due to an invalid root certificate authority (CA)

certificate installed at the computing device. For example, the device may have a root CA certificate that does not match that of the cloud service provider because the cloud service provider has a root CA certificate signed by a new CA while the device still has a root CA certificate signed by an old CA. Operation 804 is followed by operation 806. At Operation 806, in response to determining that the secure connection cannot be established, establishing a temporary non-secure connection with a device recovery service at the cloud service provider. In an embodiment, the device recovery service corresponds to DPS recovery, recovery IoT hub, and IoT recovery service as described herein. In an example, TLS validation is programmatically bypassed. Entrusted data transfer is thus enabled from the cloud service provider. In an embodiment, the temporary non-secure connection is limited to communications for updating the root CA certificate. Operation 806 is followed by operation 808. Operation 808 illustrates sending to the device recovery service, via the temporary non-secure connection, a current root CA certificate version installed at the computing device. The current root CA certificate version indicates the version of the root certificate that the device currently has installed. Operation 808 is followed by operation 810. Operation 810 illustrates receiving, from the device recovery service via the temporary non-secure connection, an updated root CA certificate. Operation 810 is followed by operation 812. Operation 812 illustrates verifying that the updated root CA certificate is a more recent version than the current root CA certificate. This provides additional verification that the device is being sent the most current version of the root CA certificate. Operation 812 is followed by operation 814. Operation 814 illustrates in response to verifying that the updated root CA certificate is a more recent version than the current root CA certificate, establishing a secure connection with the cloud service provider based on the updated root CA certificate.

Figure 9:
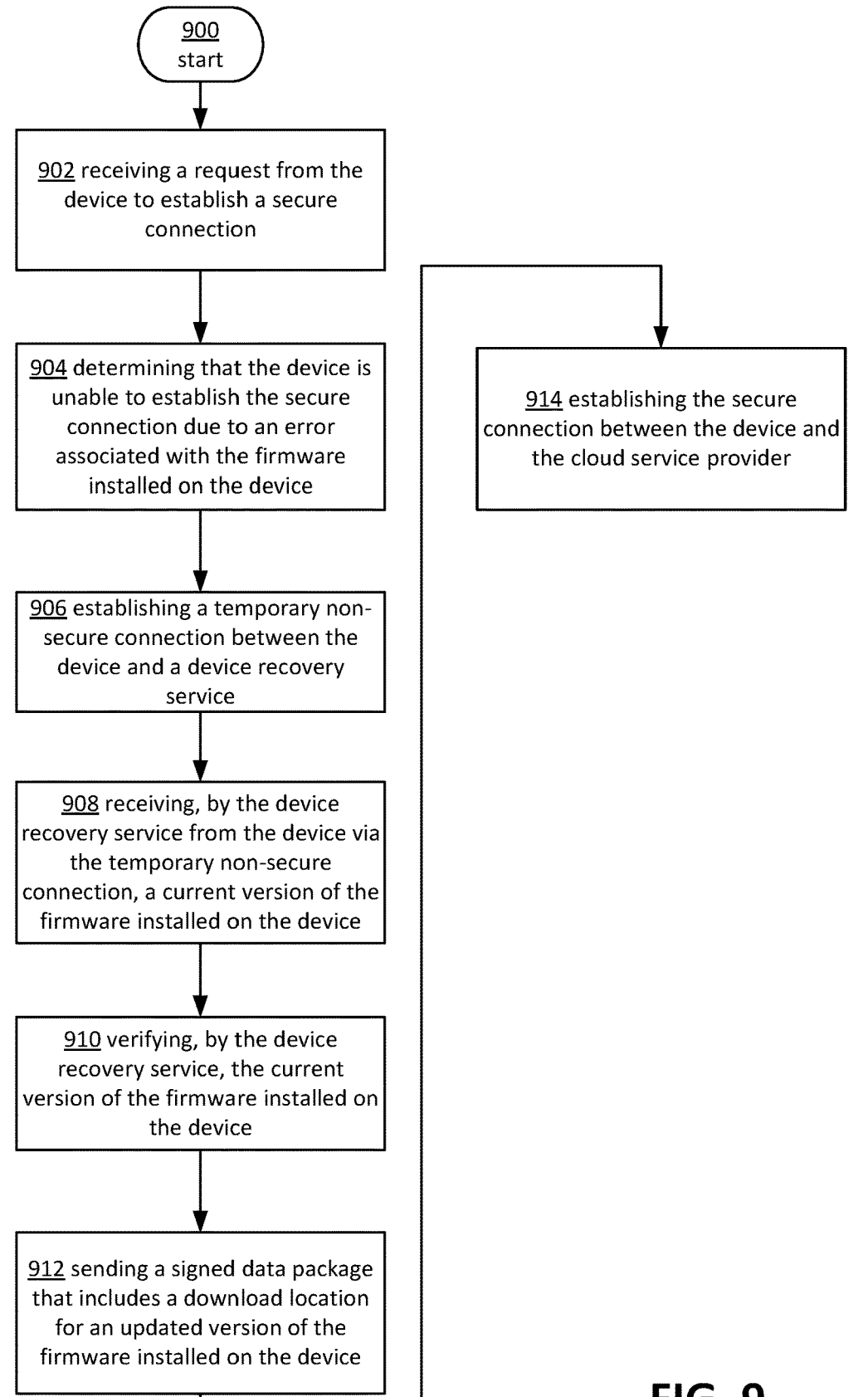
FIG. 9 depicts an example operational procedure for provisioning of devices.

FIG. 9 illustrates an example operational procedure for one embodiment of updating firmware installed on a device configured to communicate with a cloud service provider over a communications network in accordance with this disclosure. In an embodiment, the operational procedure is implemented in a computing device. The computing device has a memory that has stored thereon computer-executable instructions that, when executed, cause the computing device to perform operations as described. Referring to FIG. 9, operation 900 begins the operational procedure. Operation 900 is followed by operation 902. Operation 902 illustrates receiving, by the cloud service provider, a request from the device to establish a secure connection.

Operation 902 is followed by operation 904. Operation 904 illustrates determining that the device is unable to establish the secure connection due to an error associated with the firmware installed on the device. Examples include device update root key changes, server TLS stack updates, and other updates that are needed in the device data and firmware. In an embodiment, an instance of a device recovery service is instantiated at the cloud service provider. For example, the cloud service provider creates a new, recovery-specific service instance to provide separation from operational services. The operational services can normally be scaled down, and actual creation of recovery identities can be delayed until device recovery is needed or initiated. In an embodiment, the device recovery service corresponds to DPS recovery, recovery IoT hub, and IoT recovery service as described herein.

Operation 904 is followed by operation 906. Operation 906 illustrates establishing a temporary non-secure connection between the device and a device recovery service. In an example, TLS validation can be programmatically bypassed. Entrusted data transfer is thus enabled from the cloud service provider. Operation 906 is followed by operation 908. Operation 908 illustrates receiving, by the device recovery service from the device via the temporary non-secure connection, a current version of the firmware installed on the device. Operation 908 is followed by operation 910. Operation 910 illustrates in response to verifying, by the device recovery service, the current version of the firmware installed on the device. Operation 910 is followed by operation 912. Operation 912 illustrates sending, by the device recovery service to the device via the temporary non-secure connection, a signed data package that includes a download location for an updated version of the firmware installed on the device. Operation 912 is followed by operation 914. Operation 914 illustrates based on communications generated by the device using the updated firmware version, establishing the secure connection between the device and the cloud service provider.

In at least some embodiments, a computing device that implements a portion or all of one or more of the technologies described herein includes a general-purpose computer system that includes or is configured to access one or more computer-accessible media. FIG. 10 illustrates such a general-purpose computing device 1000. In the illustrated embodiment, computing device 1000 includes processing system 1010 which include processors 1010*a*, 1010*b*, and/or 1010*n* coupled to a system memory 10100 via an input/output (I/O) interface 1030. Computing device 1000 further includes a network interface 1040 coupled to I/O interface 1030.

In various embodiments, computing device 1000 has a processing system 1010. The processing system 1010 is a uniprocessor system with one processor 1010A or a multiprocessor system including several processors 1010A, 1010B, . . . 1010N (e.g., two, four, eight, or another suitable number). Processors 1010A . . . 1010N are any suitable processors capable of executing instructions. For example, in various embodiments, processing system 1010 includes general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010A . . . 1010N commonly, but not necessarily, implement the same ISA.

System memory 10100 is configured to store instructions and data accessible by processing system 1010. In various embodiments, system memory 10100 is implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 10100 as code 10105 and data 10106. In various embodiments, secure persistent storage 1070 is present, either within System Memory 10100 or separate from it, to hold non-volatile privacy-sensitive information.

In one embodiment, I/O interface 1030 is configured to coordinate I/O traffic between processing system 1010, system memory 10100, and any peripheral devices in the device, including network interface 1040 or other peripheral interfaces. In some embodiments, I/O interface 1030 performs any necessary protocol, timing, or other data transformations to convert data signals from one component (e.g., system memory 10100) into a format suitable for use by another component (e.g., processing system 1010). In some embodiments, I/O interface 1030 includes support for devices attached through various types of peripheral buses, such as a variant of the Peripheral Component Interconnect (PCI) bus standard or the Universal Serial Bus (USB) standard, for example. In some embodiments, the function of I/O interface 1030 is split into two or more separate components, such as a north bridge and a south bridge, for example. Also, in some embodiments some or all of the functionality of I/O interface 1030, such as an interface to system memory 10100, is incorporated directly into processing system 1010.

Network interface 1040 is configured to allow data to be exchanged between computing device 1000 and other device or devices 1060 attached to a network or network(s) 1050, such as other computer systems or devices as illustrated in FIGS. 1 through 7, for example. In various embodiments, network interface 1040 supports communication via any suitable wired or wireless general data networks, such as types of Ethernet networks, for example. Additionally, network interface 1040 supports communication via telecommunications/telephony networks such as analog voice networks or digital fiber communications networks, via storage area networks such as Fibre Channel SANs, cellular voice and/or data networks, or via any other suitable type of network and/or protocol. When a network interface 1040 provides cellular communication, its operation is supported by a credential device 1080 that provides authentication, authorization, and other related information and services.

In some embodiments, system memory 10100 is one embodiment of a computer-accessible medium configured to store program instructions and data as described herein for FIGS. 1-9 for implementing embodiments of the corresponding methods and systems. However, in other embodiments, program instructions and/or data are received, sent or stored upon different types of computer-accessible media. Generally speaking, a computer-accessible medium includes non-transitory storage media or memory media, such as magnetic or optical media, e.g., disk or DVD/CD coupled to computing device 1000 via I/O interface 1030. A non-transitory computer-accessible storage medium also includes any volatile or non-volatile media, such as RAM (e.g., SDRAM, DDR SDRAM, RDRAM, SRAM) or ROM that are included in some embodiments of computing device 1000 as system memory 10100 or another type of memory. Portions or all of multiple computing devices, such as those illustrated in FIG. 10, are used to implement the described functionality in various embodiments; for example, software components running on a variety of different devices and servers collaborate to provide the functionality. In some embodiments, portions of the described functionality are implemented using storage devices, network devices, or special-purpose computer systems, in addition to or instead of being implemented using general-purpose computer systems. The term "computing device," as used herein, refers to at least all these types of devices and is not limited to these types of devices. For purposes of this specification and the claims, the phrase "computer-readable storage medium" and variations thereof, does not include waves, signals, and/or other transitory and/or intangible communication media.

The various features and processes described above can be used independently of one another, or combined in various ways. All possible combinations and sub-combinations are intended to fall within the scope of this disclosure. In addition, certain methods or process blocks can be omitted in some implementations. The methods and processes described herein are also not limited to any particular sequence, and the blocks or states relating thereto can be performed in other sequences that are appropriate. For example, described blocks or states can be performed in an order other than that specifically disclosed, or multiple blocks or states can be combined in a single block or state. The example blocks or states can be performed in serial, in parallel or in some other manner. Blocks or states can be added to or removed from the disclosed example embodiments. The example systems and components described herein can be configured differently than described. For example, elements can be added to, removed from or rearranged compared to the disclosed example embodiments.

It will also be appreciated that various items are illustrated as being stored in memory or on storage while being used, and that these items or portions thereof can be transferred between memory and other storage devices for purposes of memory management and data integrity. Alternatively, in other embodiments some or all of the software modules and/or systems executes in memory on another device and communicate with the illustrated computing systems via inter-computer communication. Furthermore, in some embodiments, some or all of the systems are implemented or provided in other ways, such as at least partially in firmware and/or hardware, including one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures are also be stored (e.g., as software instructions or structured data) on a computer-readable medium, such as a hard disk, a memory, a network or a portable media article to be read by an appropriate drive or via an appropriate connection. The systems, modules and data structures can also be transmitted as generated data signals (e.g., as part of a carrier wave or other analog or digital propagated signal) on a variety of computer-readable transmission media, including wireless-based and wired/cable-based media, and take a variety of forms (e.g., as part of a single or multiplexed analog signal, or as multiple discrete digital packets or frames). Such computer program products also take other forms in other embodiments. Accordingly, the present disclosure can be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein can be embodied in a variety of other forms; furthermore, various omissions, substitutions and changes in the form of the methods and systems described herein can be made without departing from the spirit of the inventions disclosed herein. The accompanying claims and their equivalents are intended to cover such forms or modifications as would fall within the scope and spirit of certain of the inventions disclosed herein.

The disclosure presented herein also encompasses the subject matter set forth in the following clauses:

Clause 1: A method of updating a device, the method comprising: receiving, by a cloud service provider, a request from a device to establish a secure connection; determining that the device is unable to establish the secure connection due to an invalid root certificate authority (CA) certificate installed at the device;

instantiating, at the cloud service provider, an instance of a device recovery service; establishing a temporary non-secure connection between the device and the instance of the device recovery service, wherein the instance is partitioned from operational functions at the cloud service provider;

receiving, from the device via the temporary non-secure connection, a current root CA certificate version;

verifying, by the device recovery service, the current root CA certificate version;

sending, by the device recovery service to the device, a signed updated root CA certificate; and based on the signed updated root CA certificate, establishing a secure connection between the device and the operational functions at the cloud service provider.

Clause 2: The method of clause 1, wherein the temporary non-secure connection is established based on a recovery identifier and a service identifier received from the device.

Clause 3: The method of any of clauses 1-2, wherein the signed updated root CA certificate is sent to the device in a data package having an expiration time after which the signed updated root CA certificate cannot be installed by the device.

Clause 4: The method of any of clauses 1-3, wherein the temporary non-secure connection is limited to communications for updating the invalid root CA certificate for the device.

Clause 5: The method of any of clauses 1-4, wherein the device is configured to bypass root CA validation in order to establish the temporary non-secure connection.

Clause 6: The method of any of clauses 1-5, wherein the device is configured to programmatically bypass transport layer security (TLS) CA validation.

Clause 7: The method of clauses 1-6, further comprising:

receiving a current version of firmware installed on the device; and in response to verifying the current version of the firmware installed on the device, sending, to the device via the temporary non-secure connection, a signed data package that includes a download location for an updated version of the firmware.

Clause 8: A computing device comprising: a memory storing thereon instructions that when executed by a processing system of the computing device, cause the computing device to perform operations comprising:

initiating a process to establish a secure connection with a cloud service provider;

determining that the secure connection cannot be established due to an invalid root certificate authority (CA) certificate installed at the computing device;

in response to determining that the secure connection cannot be established, establishing a temporary non-secure connection with a device recovery service at the cloud service provider;

sending to the device recovery service, via the temporary non-secure connection, a current root CA certificate version installed at the computing device;

receiving, from the device recovery service via the temporary non-secure connection, an updated root CA certificate;

verifying that the updated root CA certificate is a more recent version than the current root CA certificate; and in response to verifying that the updated root CA certificate is a more recent version than the current root CA certificate, establishing a secure connection with the cloud service provider based on the updated root CA certificate.

Clause 9: The computing device of clause 8, wherein the computing device is configured to bypass root CA validation in order to establish the temporary non-secure connection.

Clause 10: The computing device of any of clauses 8 and 9, wherein the temporary non-secure connection is limited to communications for updating the invalid root CA certificate.

Clause 11: The computing device of any of clauses 8-10, wherein establishing the temporary non-secure connection comprises sending a recovery identifier and a service identifier to the cloud service provider.

Clause 12: The computing device of any of clauses 8-11, wherein the updated root CA certificate is received by the computing device in a data package having an expiration time after which the updated root CA certificate cannot be installed by the computing device.

Clause 13: The computing device of any of clauses 8-12, wherein the updated root CA certificate is in-memory.

Clause 14: The computing device of any of clauses 8-13, wherein the computing device is configured to perform a remote device firmware update (DFU) of a trusted root CA store on the computing device.

Clause 15: The computing device of any of clauses 8-14, wherein the instructions further comprise verifying signed data of the updated root CA certificate.

Clause 16: The computing device of any of clauses 8-15, wherein communication and security capabilities of the computing device are used to receive and process the updated root CA certificate.

Clause 17: A method of updating firmware installed on a device configured to communicate with a receiving, by the cloud service provider, a request from the device to establish a secure connection;

determining that the device is unable to establish the secure connection due to an error associated with the firmware installed on the device;

establishing a temporary non-secure connection between the device and a device recovery service;

receiving, by the device recovery service from the device via the temporary non-secure connection, a current version of the firmware installed on the device;

verifying, by the device recovery service, the current version of the firmware installed on the device;

sending, by the device recovery service to the device via the temporary non-secure connection, a signed data package that includes a download location for an updated version of the firmware installed on the device; and based on communications generated by the device using the updated firmware version, establishing the secure connection between the device and the cloud service provider.

Clause 18: The method of clause 17, wherein the firmware installed on the device comprises a security stack.

Clause 19: The method of any of clauses 17 and 18, wherein the temporary non-secure connection is established based on a recovery identifier and a service identifier received from the device.

Clause 20: The method of any of the clauses 17-19, wherein the temporary non-secure connection is limited to communications for updating the firmware on the device.

The disclosure presented herein also encompasses the subject matter set forth in the following additional clauses:

Clause A: A method of provisioning a device configured to communicate with a cloud service provider over a communications network, the method comprising: receiving, by the cloud service provider, a request from a device to establish a secure connection; determining that the device is unable to establish the secure connection due to an invalid certificate authority (CA) root certificate installed at the device; instantiating, at the cloud service provider, an instance of a device recovery service, wherein the device recovery service is partitioned from operational functions at the cloud service provider; establishing a temporary non-secure connection between the device recovery service and the device; receiving, from the device via the temporary non-secure connection, a current root CA certificate version; in response to verifying, by the device recovery service, the current CA certificate version, sending, by the device recovery service to the device, a signed updated root CA certificate; and based on the signed updated root CA certificate, establishing a secure connection between the device and the operational functions at the cloud service provider.

Clause B: The method of clause A, wherein the temporary non-secure connection is established based on a recovery identifier and a service identifier received from the device.

Clause C: The method of any of clauses A-B, wherein the updated root CA certificate is sent to the device in a data package having an expiration time after which the updated root CA certificate cannot be installed by the device.

Clause D: The method of any of clauses A-C, wherein the temporary non-secure connection is limited to communications for updating the root CA certificate for the device.

Clause E: A computing device comprising: a memory storing thereon instructions that when executed by a processing system of the computing device, cause the computing device to perform operations comprising: initiating a process to establish a secure connection with a cloud service provider; determining that the secure connection cannot be established due to an invalid certificate authority (CA) root certificate installed at the computing device; in response to determining that the secure connection cannot be established, establishing a temporary non-secure connection with a device recovery service at the cloud service provider; sending to the device recovery service, via the temporary non-secure connection, a current root CA certificate version installed at the computing device; receiving, from the device recovery service via the temporary non-secure connection, an updated root CA certificate; verifying that the updated root CA certificate is a more recent version than the current root CA certificate; and in response to verifying that the updated root CA certificate is a more recent version than the current root CA certificate, establishing a secure connection with the cloud service provider based on the updated root CA certificate.

Clause F: The computing device of clause E, wherein the computing device is configured to bypass root CA validation in order to establish the temporary non-secure connection.

Clause G: The method of any of clauses E-F, wherein the temporary non-secure connection is limited to communications for updating the root CA certificate.

Clause H: A method of updating firmware installed on a device configured to communicate with a cloud service provider over a communications network, the method comprising: receiving, by the cloud service provider, a request from the device to establish a secure connection; determining that the device is unable to establish the secure connection due to an error associated with the firmware installed on the device; instantiating, at the cloud service provider, an instance of a device recovery service; establishing a temporary non-secure connection between the instance of the device recovery service and the device; receiving, by the instance of the device recovery service from the device via the temporary non-secure connection, a current version of the firmware installed on the device; in response to verifying, by the device recovery service, the current version of the firmware installed on the device, sending, by the device recovery service to the device via the temporary non-secure connection, a signed data package that includes a download location for an updated version of the firmware installed on the device; and based on communications generated by the device using the updated firmware version installed on the device, establishing the secure connection between the device and the cloud service provider.

Clause I: The method of clause H, wherein the firmware installed on the device comprises a security stack.

What is claimed is:

1. A method of updating a device, the method comprising:

receiving, by a cloud service provider, a request from a device to establish a secure connection;

determining, by the cloud service provider, that the device is unable to establish the secure connection due to a previously valid root certificate authority (CA) certificate installed at the device that is outdated;

instantiating, at the cloud service provider, an instance of a device recovery service at the cloud service provider;

establishing a temporary non-secure connection between the device and the instance of the device recovery service, wherein the instance is partitioned from operational functions at the cloud service provider, wherein the temporary non-secure connection is limited to communications for updating the previously valid root CA certificate for the device;

receiving, by the instance of the device recovery service from the device via the temporary non-secure connection, a current root CA certificate version;

verifying, by the instance of the device recovery service, that the current root CA certificate version was a previously valid CA certificate that is outdated;

sending, by the instance of the device recovery service to the device, a signed updated root CA certificate; and based on the signed updated root CA certificate, establishing, by the cloud service provider, a secure connection between the device and the operational functions at the cloud service provider.

2. The method of claim 1, wherein the temporary non-secure connection is established based on a recovery identifier and a service identifier received from the device.

3. The method of claim 1, wherein the signed updated root CA certificate is sent to the device in a data package having an expiration time after which the signed updated root CA certificate cannot be installed by the device.

4. The method of claim 1, wherein the device is configured to bypass root CA validation in order to establish the temporary non-secure connection.

5. The method of claim 1, wherein the device is configured to programmatically bypass transport layer security (TLS) CA validation.

6. The method of claim 1, further comprising:

receiving a current version of firmware installed on the device; and in response to verifying the current version of the firmware installed on the device, sending, to the device via the temporary non-secure connection, a signed data package that includes a download location for an updated version of the firmware.

7. A computing device comprising:

a memory storing thereon instructions that when executed by a processing system of the computing device, cause the computing device to perform operations comprising:

initiating a process to establish a secure connection with a cloud service provider;

receiving, from the cloud service provider, an indication that the secure connection cannot be established due to a previously valid root certificate authority (CA) certificate installed at the computing device that is outdated;

in response to determining that the secure connection cannot be established, allowing a temporary non-secure connection to be established with a device recovery service at the cloud service provider, wherein the temporary non-secure connection is limited to communications for updating the previously valid root CA certificate for the computing device;

sending to the device recovery service, via the temporary non-secure connection, a current root CA certificate version installed at the computing device;

receiving, from the device recovery service via the temporary non-secure connection, an updated root CA certificate in response to verifying, by the device recovery service, that the current root CA certificate version was a previously valid CA certificate that is outdated;

verifying that the updated root CA certificate is a more recent version than the current root CA certificate; and in response to verifying that the updated root CA certificate is a more recent version than the current root CA certificate, establishing a secure connection with the cloud service provider based on the updated root CA certificate.

8. The computing device of claim 7, wherein the computing device is configured to bypass root CA validation in order to establish the temporary non-secure connection.

9. The computing device of claim 7, wherein establishing the temporary non-secure connection comprises sending a recovery identifier and a service identifier to the cloud service provider.

10. The computing device of claim 7, wherein the updated root CA certificate is received by the computing device in a data package having an expiration time after which the updated root CA certificate cannot be installed by the computing device.

11. The computing device of claim 7, wherein the updated root CA certificate is in-memory.

12. The computing device of claim 7, wherein the computing device is configured to perform a remote device firmware update (DFU) of a trusted root CA store on the computing device.

13. The computing device of claim 7, wherein the instructions further comprise verifying signed data of the updated root CA certificate.

14. The computing device of claim 7, wherein communication and security capabilities of the computing device are used to receive and process the updated root CA certificate.

15. A method of updating firmware installed on a device configured to communicate with a cloud service provider over a communications network, the method comprising:

receiving, by the cloud service provider, a request from the device to establish a secure connection;

determining, by the cloud service provider, that the device is unable to establish the secure connection due to an error associated with the firmware installed on the device;

establishing, by the cloud service provider, a temporary non-secure connection between the device and a device recovery service, wherein the temporary non-secure connection is limited to communications for updating the firmware on the device;

receiving, by the device recovery service from the device via the temporary non-secure connection, a current version of the firmware installed on the device;

verifying, by the device recovery service, the current version of the firmware installed on the device;

sending, by the device recovery service to the device via the temporary non-secure connection, a signed data package that includes a download location for an updated version of the firmware installed on the device and a firmware hash to verify the signed data package; and based on communications generated by the device using the updated firmware version, establishing the secure connection between the device and the cloud service provider.

16. The method of claim 15, wherein the firmware installed on the device comprises a security stack.

17. The method of claim 15, wherein the temporary non-secure connection is established based on a recovery identifier and a service identifier received from the device.

* * * * *